United States Patent
Li et al.

(10) Patent No.: US 10,491,248 B2
(45) Date of Patent: Nov. 26, 2019

(54) EFFICIENT POLYPHASE ARCHITECTURE FOR INTERPOLATOR AND DECIMATOR

(71) Applicant: Samsung Electronics Co., Ltd., Gyeonggi-do (KR)

(72) Inventors: Liangbin Li, San Diego, CA (US); Pranav Dayal, San Diego, CA (US); Jungwon Lee, San Diego, CA (US); Gennady Feygin, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/974,218

(22) Filed: May 8, 2018

(65) Prior Publication Data

US 2018/0254785 A1    Sep. 6, 2018

Related U.S. Application Data

(63) Continuation of application No. 15/402,651, filed on Jan. 10, 2017, now Pat. No. 9,966,977.

(60) Provisional application No. 62/412,452, filed on Oct. 25, 2016.

(51) Int. Cl.
*H04B 1/00* (2006.01)
*H04B 3/462* (2015.01)

(52) U.S. Cl.
CPC ......... *H04B 1/0042* (2013.01); *H04B 1/0046* (2013.01); *H04B 3/462* (2013.01)

(58) Field of Classification Search
CPC .... H03H 17/06; H04B 1/0042; H04B 1/0046; H04B 3/462
See application file for complete search history.

(56) References Cited

U.S. PATENT DOCUMENTS

| | | | |
|---|---|---|---|
| 5,982,832 A | 11/1999 | Ko | |
| 6,973,141 B1* | 12/2005 | Isaksen | H04L 25/03834 332/100 |
| 7,245,237 B2 | 7/2007 | Lopez-Estrada et al. | |

(Continued)

FOREIGN PATENT DOCUMENTS

WO    WO 2013/139395    9/2013

OTHER PUBLICATIONS

Chao, W., Polyphase Structure-Based Approaches for FIR Mth-band Filters and Constrained Filter Banks: Design, Implementation and Applications, Nov. 2007, 201 pages, Canada.

(Continued)

*Primary Examiner* — Janice N Tieu
(74) *Attorney, Agent, or Firm* — The Farrell Law Firm, P.C.

(57) ABSTRACT

Apparatuses (and methods of manufacturing same), systems, and methods concerning polyphase digital filters are described. In one aspect, an apparatus is provided, including at least one pair of subfilters, each having symmetric coefficients, and a lattice comprising two adders and feedlines corresponding to each of the at least one pair of subfilters, each having symmetric coefficients. In one aspect, the apparatus is a polyphase finite impulse response (FIR) digital filter, including an interpolator and a decimator, where each of the interpolator and the decimator have at least one pair of subfilters, each having symmetric coefficients, and a lattice comprising two adders and feedlines corresponding to each of the at least one pair of subfilters, each having symmetric coefficients.

10 Claims, 7 Drawing Sheets

(56) References Cited

U.S. PATENT DOCUMENTS

| | | | |
|---|---|---|---|
| 7,477,323 | B2 | 1/2009 | Chou |
| 7,515,651 | B1 | 4/2009 | Haddadin |
| 7,698,355 | B2 | 4/2010 | Bhuvanagiri et al. |
| 8,626,809 | B2 | 1/2014 | Yang et al. |
| 8,872,678 | B2 | 10/2014 | Jonsson et al. |
| 9,385,764 | B2 | 7/2016 | Rexberg et al. |
| 2002/0186795 | A1 | 12/2002 | Ohtaki |
| 2007/0237059 | A1 | 10/2007 | Kasahara |
| 2009/0262758 | A1* | 10/2009 | Kobayashi .......... H04L 27/2628 370/480 |
| 2016/0079960 | A1* | 3/2016 | Berscheid .......... H03H 17/0275 708/306 |
| 2016/0182014 | A1 | 6/2016 | Bhargava et al. |

OTHER PUBLICATIONS

Viscito, E. et al., The Analysis and Design of Multidimensional FIR Perfect Reconstruction Filter Banks for Arbitrary Sampling Lattices, IEEE Transactions on Circuits and Systems, vol. 38, No. 4, Jan. 1991.

Vim, W. H. et al., Extended polyphase structures for multirate DSP, IEE Proceedings-F, vol. 139, No. 4, Aug. 1992.

Vaidyanathan, P.P., et al., Efficient Reconstruction of Band-Limited Sequences from Nonuniformly Decimated Versions by Use of Polyphase Filter Banks, IEEE Transactions on Acoustics, Speech, and Signal Processing, vol. 38, No. 11, Nov. 1990.

Vaidyanathan, P.P., Mulitrate Digital Filters, Filter Banks, Polyphase Networks, and Applications: A Tutorial, Proceedings of the IEEE, vol. 78, No. 1, Jan. 1990.

\* cited by examiner

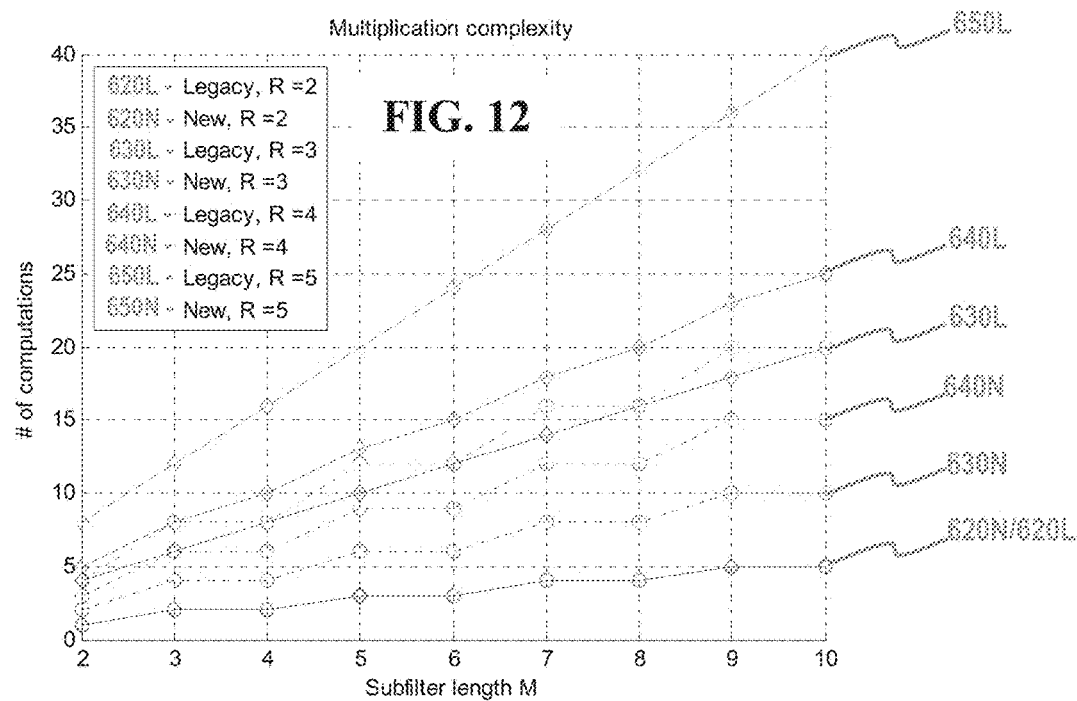
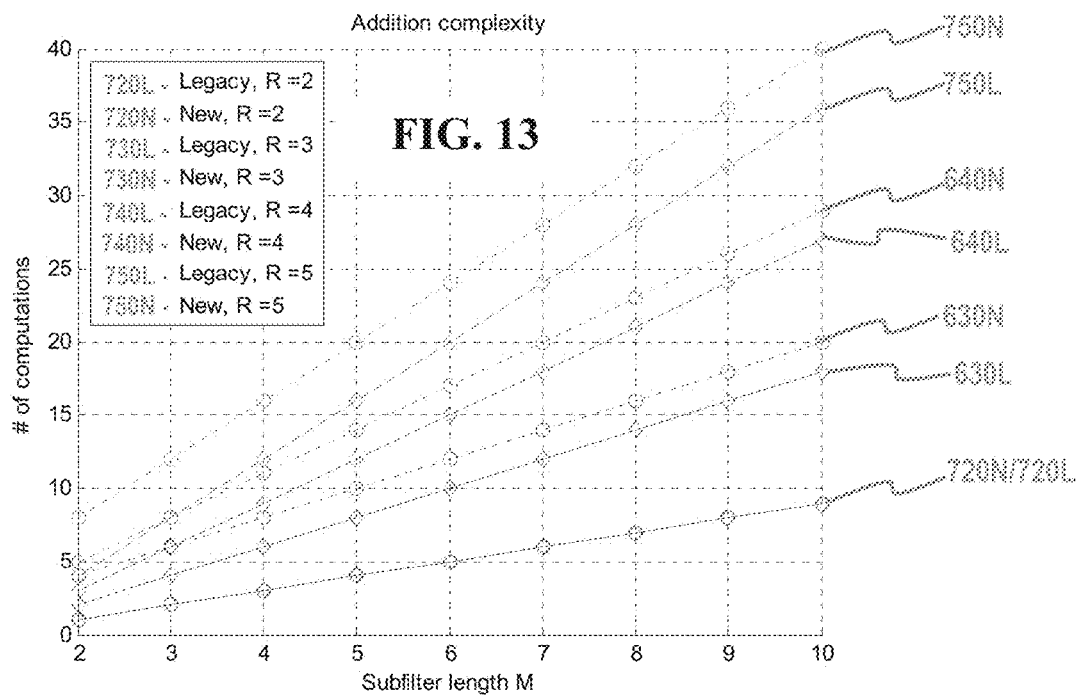

EFFICIENT POLYPHASE ARCHITECTURE FOR INTERPOLATOR AND DECIMATOR

PRIORITY

This application is a continuation of, and claims priority under 35 U.S.C. § 120 to, U.S. patent application Ser. No. 15/402,651, which was filed on Jan. 10, 2017, issued on May 8, 2018 as U.S. Pat. No. 9,966,977, and claimed priority under 35 U.S.C. § 119(e) to U.S. Prov. Pat. App. Ser. No. 62/412,452 filed on Oct. 25, 2016 in the U.S. Patent and Trademark Office, the entire contents of all of which are incorporated herein by reference.

FIELD

The present disclosure relates generally to multirate digital filters, filter banks, and signal processing, and more particularly, to a polyphase architecture for an interpolator and a decimator.

BACKGROUND

Multirate digital filters are used in telecommunications, speech processing, image compression, antenna/radar systems, spectrum analysis, and in the wide myriad of applications and functions in the growing Internet of Things (IoT). "Multirate" literally means "multiple rates," i.e., that there are multiple sampling rates being used in the system.

The basic building blocks of a multirate digital system are interpolation filters or interpolators, which increase the sampling rate of an input digital signal, and decimations filters or decimators, which decrease the sampling rate of an input digital signal.

SUMMARY

Accordingly, the present disclosure aims at addressing at least the problems and/or disadvantages described herein and to provide at least the advantages described below.

According to an aspect of the present disclosure, an apparatus is provided, including at least one pair of subfilters, each having symmetric coefficients, and a lattice comprising two adders and feedlines corresponding to each of the at least one pair of subfilters, each having symmetric coefficients.

According to an aspect of the present disclosure, an apparatus having a polyphase architecture for sampling rate conversion is provided, including a lattice comprising one or more sets of adders and feedlines and at least one group of subfilters, where each group of subfilters has a corresponding one of the one or more sets of adders and feedlines comprising the lattice, wherein coefficients of subfilters in each group of subfilters are generated from coefficients in an initial set of coefficients, where the coefficients in an initial set of coefficients exhibit antisymmetric pair properties, and wherein each group of subfilters and its corresponding set of adders and feedlines generate the same overall output as subfilters having the coefficients from the initial set of coefficients.

According to an aspect of the present disclosure, a method for a polyphase interpolator is provided, including receiving, by a bank of R subfilters, each of N samples in parallel as input to the polyphase interpolator, wherein the bank of R subfilters comprises one or more pairs of subfilters, where each pair of subfilters has symmetric coefficients; adding outputs of a first subfilter and a second subfilter in one of the one or more pairs of subfilters and providing the added outputs as parallel input to a parallel-to-serial (P2S) converter; and subtracting the output of the second subfilter from the output of the first subfilter in the one of the one or more pairs of subfilters and providing the result of the subtraction as parallel input to the P2S converter, wherein the symmetric coefficients of each of the one or more pairs of subfilters are transformed from an initial pair of antisymmetric coefficients $h_m$ and $h_{R-m}$, R being a total number of subfilters, and m being a subfilter index, where m=1, 2, . . . , R.

According to an aspect of the present disclosure, a method for a polyphase decimator is provided, including adding, by a first adder of a pair of adders, a first output and a second output of the plurality of outputs and providing the added outputs as input to a first subfilter of a pair of subfilters with symmetric coefficients, wherein the pair of subfilters is part of a bank of R subfilters; subtracting, by a second adder of the pair of adders, the second output from the first output and providing the subtracted output as input to a second subfilter of the pair of subfilters; and generating, from an output of the bank of R subfilters, a stream of N samples as output of the polyphase decimator, wherein the symmetric coefficients of each of the one or more pairs of subfilters are transformed from an initial pair of antisymmetric coefficients $h_m$ and $h_{R-m}$, R being a total number of subfilters, and m being a subfilter index, where m=1, 2, . . . , R.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 12 and 13 show simulation results regarding multiplication complexity and addition complexity, respectively, of conventional vs. digital filter systems according to an embodiment of the present disclosure.

DETAILED DESCRIPTION

Figure 1:
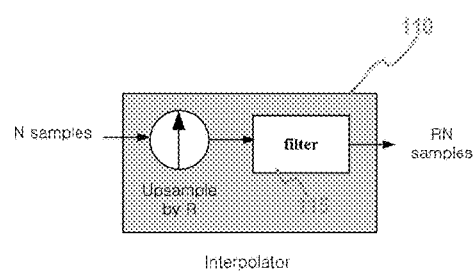
FIGS. 1 and 2 are block diagrams of an interpolator and a decimator, respectively, in a multirate digital sampling system.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification do not necessarily refer to the same embodiment.

Figure 2:
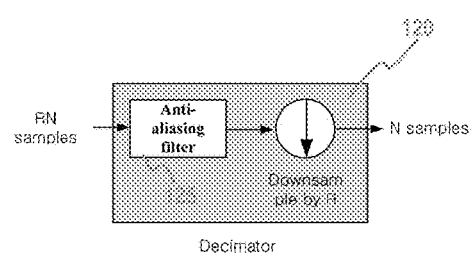

FIG. 1 shows an interpolator 110 which receives N samples as input, upsamples the input by R, and outputs RN samples. FIG. 2 shows a decimator 120 receives the RN samples as input, downsamples by R, and outputs N samples.

More specifically, the interpolator 110 upsamples by R, then applies imaging filter 115 to remove the extra images created by the upsampling before outputting the RN samples. The decimator 120 applies an anti-aliasing filter 125 to an input RN samples to eliminate aliasing (the overlap of shifted versions of a signal) and/or out-of-band noise, and then downsamples by R to produce N samples as output.

The digital filters described above can be implemented using a finite impulse response (FIR) filter at high sampling rates. Polyphase decomposition can be used on such an FIR filter to decompose the FIR into R groups, which results in a polyphase architecture using R subfilters, thereby reducing the sampling rate per subfilter, thus reducing the number of computations that need to be made during processing.

Figure 3:
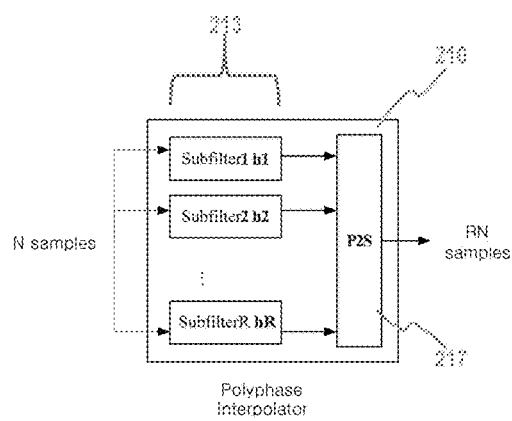
FIGS. 3 and 4 are block diagrams of an interpolator and a decimator, respectively, in a polyphase architecture of a multirate digital sampling system.
Figure 4:
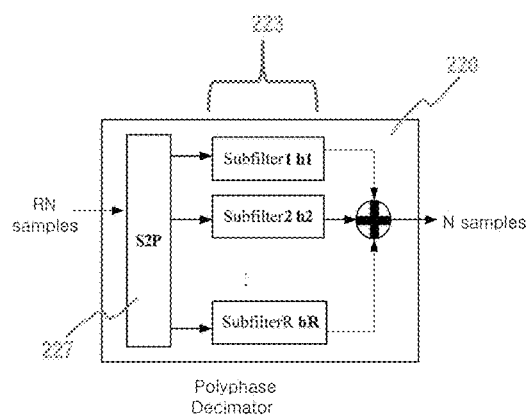

More specifically, polyphase decomposition results in an interpolator and decimator as shown in FIGS. 3 and 4, respectively.

As shown in FIG. 3, the polyphase decomposition results in an interpolator 210 with an input of N samples which are received by a matching set of Subfilters 1 to R 213 performing functions h1 to hR, respectively. The parallel outputs of Subfilters 1 to R 213 are input into parallel-to-serial converter (P2S) 217 which outputs a serial stream of RN samples.

As shown in FIG. 4, the polyphase decomposition results in an decimator 220 with an input of a serial stream of RN samples which are received by a serial-to-parallel converter (S2P) 227. The S2P 227 outputs R parallel streams of N samples to a matching set of Subfilters 1 to R 223 performing functions h1 to hR, respectively. The parallel outputs of Subfilters 1 to R 213 are added together to generate an output of N samples.

The polyphase decomposition and resulting polyphase architecture of each subfilter are described generally below.

The Z domain representation of the long FIR filter having coefficients $[g_0, g_1, g_2, g_3, \ldots, g_K]$ can be written as Equation (1):

$$H(Z) = \sum_{k=0:K} g_k Z^{-k} \qquad (1)$$

When $K = MR-1$ for some integer M, the FIR filter can be re-written—or decomposed—into Equation (2).

$$H(Z) = \qquad (2)$$
$$\sum_{m=0:R-1} (g_m + g_{R+m}Z^{-R} + g_{2R+m}Z^{-2R} + \ldots + g_{(M-1)R+m}Z^{-(M-1)R})Z^{-m}$$

As shown in Equation (2), the partial coefficients g within the parentheses are linear combination of $Z^{-kR}$ for some integer k. Thus, the partial coefficients g for each value of m make one subfilter for the decimator, as shown by Equations (3)(a)-3(c) below:

$$h_1 = [g_1, g_{R+1}, g_{2R+1}, \ldots, g_{K(M-1)R+1}] \quad (3)(a)$$

$$h_2 = [g_2, g_{R+2}, g_{2R+2}, \ldots, g_{K(M-1)R+2}] \quad (3)(b)$$

$$\ldots$$

$$h_R = [g_0, g_R, g_{2R}, \ldots, g_{K(M-1)R}] \quad (3)(c)$$

Here, each of the R subfilters has M taps, as will be discussed further in reference to FIGS. 5-8 below.

In embodiments of the present disclosure, the finite impulse response (FIR) filter underlying the polyphase decomposition/architecture is a Nyquist filter (an N-th band filter) which further simplifies the computations. In a Nyquist filter, K=MR where M is even. The Nyquist filter with ratio R needs to satisfy the condition shown as a time-domain representation in Equation (4).

$$g_{Rk} = 0, \text{ for all } k \text{ except } k = \frac{K}{2R} \quad (4)$$

This translates to the frequency domain definition of a Nyquist filter as Equation (5).

$$\sum_{k=0:R-1} H\left(\frac{f}{F_s} - \frac{k}{R}\right) = c e^{-j2\pi \frac{fK}{F_s 2}} \quad (5)$$

where $F_s$ is the sampling rate of the digital filter and c denotes a constant. The phase ramp $$e^{-j2\pi \frac{fK}{F_s 2}}$$

is based on the assumption that the filter design is causal. The Nyquist filter preserves not only the linear phase property (i.e., inband output signals are delayed versions of inband input signals), but also the last subfilter $h_R$ always has an impulse as the response of the filter. Moreover, when R is even, one subfilter has symmetric coefficients, which allows for further reductions in computations.

For example, when R=2, the Nyquist filter becomes a halfband filter (HBF), where the coefficients of the underlying FIR are shown in Equation (6).

$$G_{R=2} = [g_1, 0, g_3, 0, \ldots g_{2n+1}, 1, g_{2n+1}, \ldots, 0, g_3, 0, g_1] \quad (6)$$

where there are only two subfilters, one having $h_R$, the impulse as the response, while the other has $h_1$, which is symmetric, as shown in Equation (7):

$$h_1 = \underbrace{[g_1, g_{R+1}, \ldots, g_{R+1}, g_1]}_{M \text{ entries}} \quad (7)$$

Figure 5:
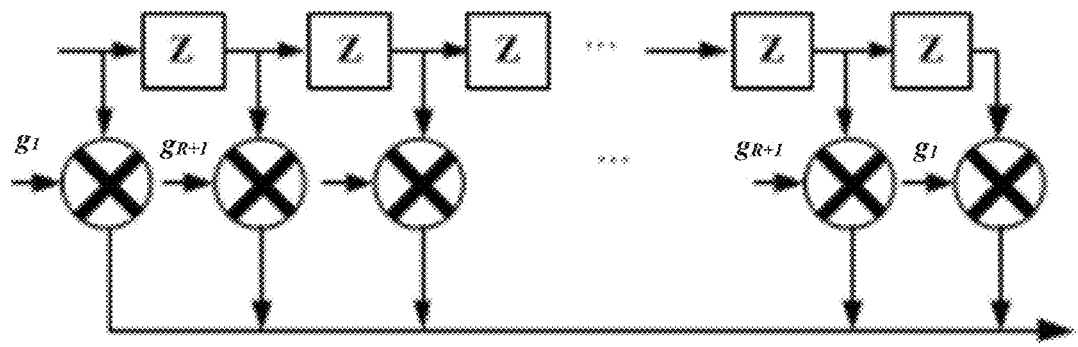
FIG. 5 is block diagram of the function $h_1$ performed by subfilter1 in FIG. 4.

This allows for further simplification, as shown by comparing the taps required for a subfilter performing $h_1$ in the conventional interpolator/decimator design, as shown in FIG. 5. As explained above, and shown in FIG. 5, each subfilter has M taps (for each coefficient), starting with $g_1$ and, because of the symmetry, ending with $g_1$. Thus, M−1 additions and M multiplications need to be performed, as shown by the multipliers and downward arrows in FIG. 5, in the subfilter performing $h_1$ in the conventional interpolator/decimator design in FIGS. 3 and 4.

Figure 6:
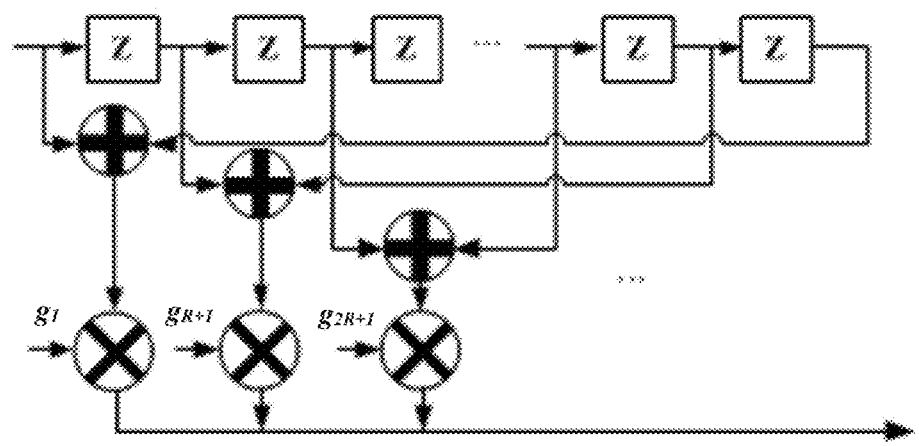
FIG. 6 is a block diagram of the function $h_1$ performed by subfilter1 in FIG. 4 with a simplified architecture using the symmetry of the coefficients.

However, because of the symmetry of the $h_1$ coefficients, the multiplications can be reduced, as shown in FIG. 6. In FIG. 6, there are still M taps requiring M−1 additions, but both taps which need to be multiplied by the same coefficient are added together for multiplication. To be precise, this results in $\lceil M/2 \rceil^1$ multiplications and M−1 additions, thus saving $\lfloor M/2 \rfloor^2$ multiplications.

[1] $\lceil x \rceil$ is the ceiling function, i.e., giving the smallest integer greater than or equal to x.

[2] $\lfloor x \rfloor$ is the floor function, i.e., giving the largest integer less than or equal to x.

Figure 7:
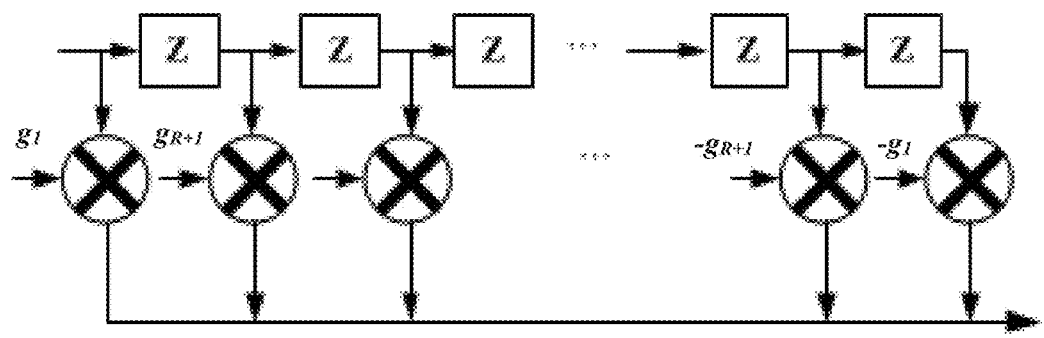
FIG. 7 is block diagram of the function $h_1$ performed by subfilter1 in FIG. 4, where the coefficients have an odd symmetry.
Figure 8:
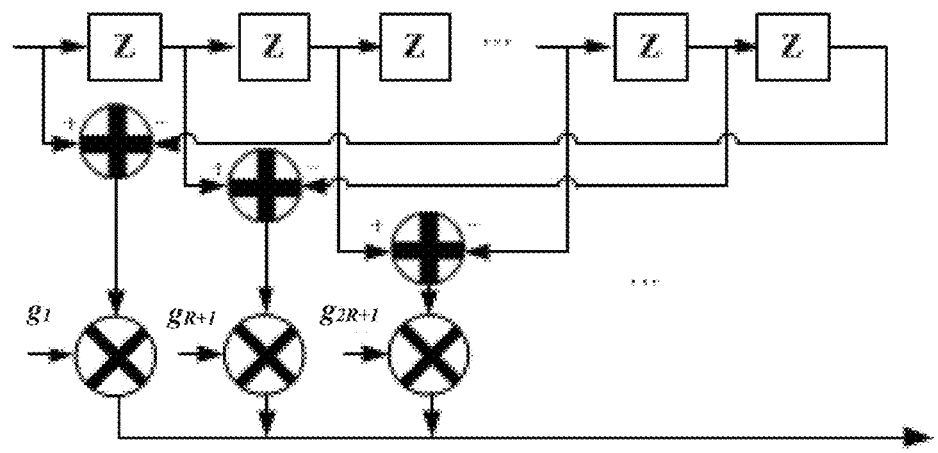
FIG. 8 is a block diagram of the function $h_1$ performed by subfilter1 in FIG. 4 with a simplified architecture using the odd symmetry of the coefficients.

The coefficients in FIGS. 5 and 6 are even symmetric (i.e., $h_1 = [g_1, g_{R+1}, \ldots, g_{R+1}, g_1]$); however, the architecture within a subfilter having coefficients with odd symmetry (i.e., $h_1 = [g_1, g_{R+1}, \ldots, -g_{R+1}, -g_1]$) can also be simplified in the same manner, as shown in FIGS. 7 and 8.

When R=3, the underlying Nyquist filter coefficients are given in Equation (8):

$$G_{R=3} = [g_1, g_2, 0, g_4, g_5, 0, \ldots g_{3n+1}, g_{3n+2}, 1, g_{3n+2}, g_{3n+1}, \ldots, 0, g_5, g_4, 0, g_2, g_1] \quad (8)$$

where there are three polyphase subfilters, with functions as shown by Equations (9)(a)-9(c):

$$h_1 = [g_1, g_4, \ldots, g_5, g_2] \quad (9)(a)$$

$$h_2 = [g_2, g_5, \ldots, g_4, g_1] \quad (9)(b)$$

$$h_{R=3} = [0, 0, \ldots, 1, \ldots, 0, 0] \quad (9)(c)$$

The last subfilter, $h_R$, as always, is the impulse response (Eq. 9(c)), but neither $h_1$ (Eq. 9(a)) nor $h_2$ (Eq. 9(b)) are symmetric (unlike Eq. 6 for R=2); however, $h_1$ (Eq. 9(a)) and $h_2$ (Eq. 9(b)) are anti-symmetric to each other, which, as shown below, becomes a useful property in embodiments of the present disclosure.

When R=4, the underlying Nyquist filter coefficients are given in Equation (10):

$$G_{R=4} = [g_1, g_2, g_3, 0, g_5, g_6, g_7, 0, \ldots g_{4n+1}, g_{4n+2}, g_{4n+3}, 1, g_{4n+3}, g_{4n+2}, g_{4n+1}, \ldots, 0, g_7, g_6, g_5, 0, g_3, g_2, g_1] \quad (10)$$

where the four resulting polyphase subfilters have the functions as shown by Equations (11)(a)-11(d):

$$h_1 = [g_1, g_5, \ldots, g_7, g_3] \quad (11)(a)$$

$$h_2 = [g_2, g_6, \ldots, g_6, g_2] \quad (11)(b)$$

$$h_3 = [g_3, g_7, \ldots, g_5, g_1] \quad (11)(c)$$

$$h_{R=4} = [0, 0, \ldots, 1, \ldots, 0, 0] \quad (11)(d)$$

The last subfilter, $h_R$, as always, is the impulse response (Eq. 11(d)), the coefficients of $h_2$ (Eq. 11(b)) are symmetric, and $h_1$ (Eq. 11(a)) and $h_3$ (Eq. 11(c)) are antisymmetric to each other.

Generalizing the observations above to any arbitrary R for a polyphase Nyquist filter structure:
  $h_R$ always has an impulse as the impulse response;
  if R is even, one subfilter will have symmetric coefficients and, if R is large enough, at least one pair of subfilters with antisymmetric coefficients; and
  if R is odd, the subfilters will all form pairs of subfilters with antisymmetric coefficients.

Considering the prevalence of pairs of antisymmetric coefficient subfilters, an embodiment of the present disclosure takes advantage of their mathematical properties to further simplify the polyphase Nyquist filter architecture, as explained below.

For an interpolator, assume function $h_m$ having antisymmetric coefficients with function $h_{(R-m)}$ (which is how the antisymmetric subfilters are themselves symmetric, e.g., $h_1$ is antisymmetric to $h_{3=R-1}$). The desired output can be written as $x*h_m$, where x denotes the impulse sequence and * is the convolution operator, which can be rewritten as Equation 12(a):

$$x*h_m = x*\left(\frac{h_m + h_{R-m}}{2}\right) + x*\left(\frac{h_m - h_{R-m}}{2}\right) \qquad (12)(a)$$

Similarly, the desired output for $h_{(R-m)}$ can be written as $x*h_{(R-m)}$, which can be further rewritten as Equation 12(b):

$$x*h_{R-m} = x*\left(\frac{h_m + h_{R-m}}{2}\right) - x*\left(\frac{h_m - h_{R-m}}{2}\right) \qquad (12)(b)$$

As can be seen in Eqs. 12(a) and 12(b), the antisymmetric pair of $h_m$ and $h_{(R-m)}$ share the same terms, but differ by whether those terms are added or one is subtracted from the other. This means the two terms in $h_m$ and $h_{(R-m)}$ may only need to be calculated once, rather than twice (in each of subfilters $h_m$ and $h_{(R-m)}$), if the appropriate architecture is used.

Figure 9:
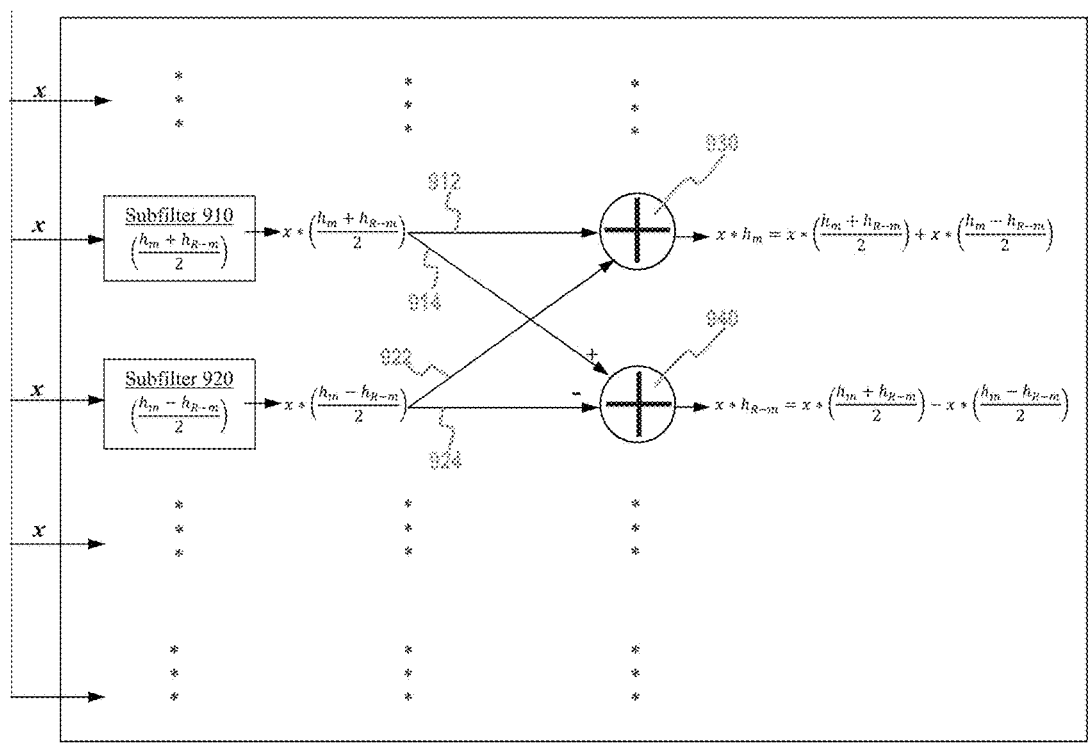
FIG. 9 is a block diagram of the general structure for pairs of subfilters having antisymmetric coefficients, according to an embodiment of the present disclosure.

In other words, as shown in FIG. 9, the new pair of subfilters replacing the two separate subfilters $h_m$ and $h_{(R-m)}$ would consist of one subfilter 910 whose coefficient is $$\left(\frac{h_m + h_{R-m}}{2}\right),$$

and another subfilter 920 whose coefficient is $$\left(\frac{h_m - h_{R-m}}{2}\right),$$

and then a lattice structure which appropriately adds and subtracts those two outputs. Thus, the output of subfilter 910 is $$x*\left(\frac{h_m + h_{R-m}}{2}\right),$$

and the output of subfilter 920 is $$x*\left(\frac{h_m - h_{R-m}}{2}\right)$$

the two terms need to generate both $x*h_m$ (Eq. 12(a)) and $x*h_{(R-m)}$ (Eq. 12(b)).

The latticework after subfilters 910 and 920 consist of feedlines 912 and 914 from subfilter 910, feedlines 922 and 924 from subfilter 920, adder 930, and adder 940. Through this lattice, subfilter 910 output $$x*\left(\frac{h_m + h_{R-m}}{2}\right)$$

and subfilter 920 output $$x*\left(\frac{h_m - h_{R-m}}{2}\right)$$

are fed by feedlines 912 and 922, respectively, to adder 930, where they are added together to form Eq. 12(a), as shown in FIG. 9. Similarly, subfilter 910 output $$x*\left(\frac{h_m + h_{R-m}}{2}\right)$$

is fed by feedline 914 to adder 940 and subfilter 920 output $$x*\left(\frac{h_m - h_{R-m}}{2}\right)$$

is fed by feedline 924, in negative form, to adder 940, where they are added together to form Eq. 12(b), as shown in FIG. 9.

This structure is generally applicable to any antisymmetric pair $h_m$ and $h_{(R-m)}$.

Similarly, regarding the decimator, and assuming subfilter m having antisymmetric coefficients with subfilter R−m, the output/summation of all the antisymmetric pairs can be expressed as Equation (13):

$$\sum_m x_m * h_m + x_{R-m} * h_{R-m} = \qquad (13)$$
$$\sum_m (x_m + x_{R-m}) * \left(\frac{h_m + h_{R-m}}{2}\right) + (x_m - x_{R-m}) * \left(\frac{h_m - h_{R-m}}{2}\right)$$

where $x_m$ denotes the downsampled sequence by ratio R from the input sequence x with phase m.

Similarly to Eqs. 12(a) and 12(b), the summation on the right-hand side of Eq. 13 has antisymmetric pairs of $h_m$ and $h_{(R-m)}$ which share the same terms, but differ in terms of whether those terms are added or one is subtracted from the other. This means the two terms in both subfilters m and (R−m) may only need to be calculated once, rather than twice (for each subfilter), if the appropriate architecture is used. In other words, the new pair of subfilters replacing the two separate subfilters m and (R−m) would consist of one subfilter whose coefficient was $$\left(\frac{h_m + h_{R-m}}{2}\right),$$

and another subfilter whose coefficient was $$\left(\frac{h_m + h_{R-m}}{2}\right).$$

However, differently than the interpolator, the lattice structure for adding and subtracting is placed before the subfilters in the decimator. Accordingly, the inputs to each adder in the decimator is $x_m$ and $x_{(R-m)}$, with the corresponding outputs for each pair of adders being $x_m - x_{(R-m)}$ and $x_m + x_{(R-m)}$. The subsequent output of each pair of subfilters is $$(x_m + x_{R-m}) * \left(\frac{h_m + h_{R-m}}{2}\right) \text{ and } (x_m - x_{R-m}) * \left(\frac{h_m - h_{R-m}}{2}\right).$$

Figures 10, 11:
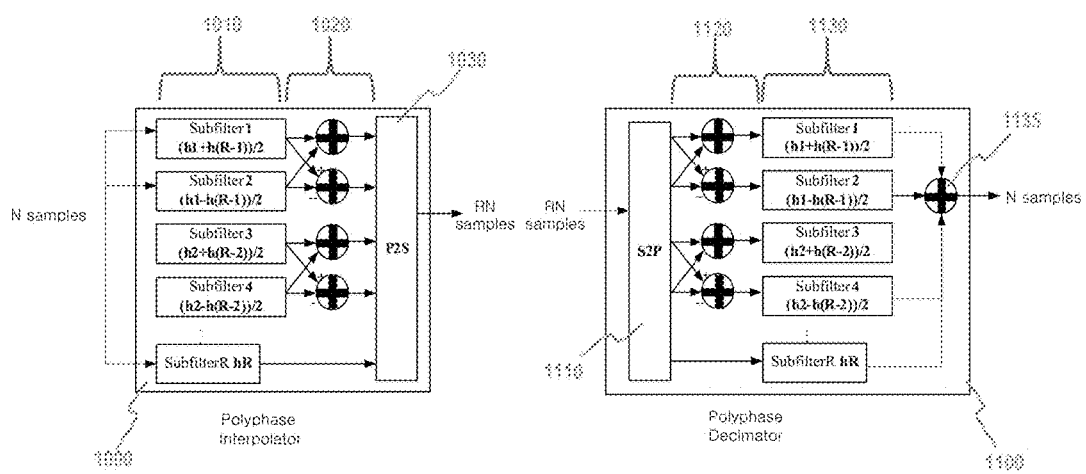
FIGS. 10 and 11 are block diagrams of an interpolator and a decimator, respectively, in a polyphase architecture of a multirate digital sampling system, according to an embodiment of the present disclosure.

FIGS. 10 and 11 are a general form of such an architecture for an interpolator and a decimator, respectively, according to an embodiment of the present disclosure, showing the new structure for each pair of subfilters with antisymmetric coefficients (i.e., FIGS. 10 and 11 assume that R is odd). A lattice structure is formed at the subfilter outputs in the interpolator to appropriately add and subtract the outputs of the two subfilters, and at the inputs to the subfilters in the decimator to appropriately add and subtract the inputs of the two subfilters.

As shown in FIG. 10, interpolator 1000 has an input of N samples which are received by a matching set of Subfilters 1 to R 1010. Subfilters 1 and 2 and Subfilters 3 and 4 form two pairs of subfilters, with coefficient functions in the form of $$\left(\frac{h_m + h_{R-m}}{2}\right) \text{ and } \left(\frac{h_m - h_{R-m}}{2}\right).$$

Thus, in the lattice structure 1020 of interpolator 1000, each pair of subfilters have outputs going to a pair of adders, as explained in detail in reference to FIG. 9. The parallel outputs of each pair of adders corresponding to a pair of subfilters constitute the antisymmetric coefficient output, which is input to parallel-to-serial converter (P2S) 1030 which outputs a serial stream of RN samples.

As shown in FIG. 11, decimator 1100 has an input of a serial stream of RN samples which are received by a serial-to-parallel converter (S2P) 1110. The S2P 1110 outputs R parallel streams of N samples into the lattice structure 1120 of decimator 1100, in which pairs of adders correspond to the pairs of subfilters with coefficient functions in the form of $$\left(\frac{h_m + h_{R-m}}{2}\right) \text{ and } \left(\frac{h_m - h_{R-m}}{2}\right)$$

among Subfilters 1 to R 1130. The parallel outputs of Subfilters 1 to R 1130 in decimator 1100 are added in 1135 to produce an output of N samples.

Although FIGS. 10 and 11 are meant to show the general form of architecture of an interpolator and decimator according to an embodiment of the present invention, what is shown in FIGS. 10 and 11 also corresponds to specific architecture when R=5. For example, when R=5, there will be five functions, $h_1$, $h_2$, $h_3$, $h_4$, and $h_5$. The impulse response function is $h_{5=R}$, and, because R=5=odd, and the remaining functions are antisymmetric pairs, namely, $h_1$ (m=1) and $h_4$ (R−m=4), and $h_2$ (m=2) and $h_3$ (R−m=3). The resulting polyphase architecture according to embodiments of the present disclosure looks like FIGS. 10 and 11, with two pairs of subfilters, and impulse response subfilter R=5 at the bottom for function $h_R = h_5$. Subfilters 1 and 2 in FIG. 10 would be for the antisymmetric pair $h_1$ and $h_4$, and subfilters 3 and 4 would be for the antisymmetric pair $h_2$ and $h_3$.

Based on the above, the following may be stated concerning applying embodiments of the present disclosure to a polyphase Nyquist filter structure with any arbitrary R:
  $h_R$ always has the impulse as the impulse response;
  if R is even, one subfilter will have symmetric coefficients and the remaining R−2 subfilters will form $$\frac{R-2}{2}$$

pairs of subfilters having antisymmetric coefficients; and
  if R is odd, the remaining R−1 subfilters will form $$\frac{R-1}{2}$$

pairs of subfilters having antisymmetric coefficients.

The approach according to embodiments of the present disclosure requires less computations than the legacy approach.

In the legacy approach, where R−1 subfilters have length M and R is odd, each subfilter needs M multiplications and M−1 additions. The total number of multiplications and additions when R is odd are M(R−1) and (M−1)(R−1), respectively. When R is even, there is one subfilter with symmetric coefficients, whose number of multiplications can be reduced to ⌈M/2⌉ multiplications and M−1 additions, thus saving ⌊M/2⌋ multiplications, as discussed above. The total number of multiplications for even R is M(R−2)+⌈M/2⌉. The number of total additions is the same as odd R.

According to embodiments of the present disclosure, the pairing and new structure for antisymmetric coefficient subfilters (which, in a sense, results in symmetric coefficients) means that R−1 subfilters have symmetric coefficients whether R is odd or even. Thus, the total number of multiplications is always ⌈M/2⌉(R−1). However, the number of additions is greater: an extra R−1 additions for odd R and an extra R−2 additions for even R.

Table 1 provides a summary of these differences.

TABLE 1

| | Complexity Comparison for a polyphase interpolator generating R output samples | | | | | |
|---|---|---|---|---|---|---|
| | The # of multiplications | | | The # of additions | | |
| | Legacy approach | New efficient approach | Saving | Legacy approach | New efficient approach | Cost |
| Odd R | M(R − 1) | ⌈M/2⌉(R − 1) | ⌊M/2⌋ (R − 1) | (M − 1)(R − 1) | M(R − 1) | R − 1 |
| Even R | M(R − 2) + ⌈M/2⌉ | ⌈M/2⌉(R − 1) | ⌊M/2⌋ (R − 2) | (M − 1)(R − 1) | (M − 1)(R − 1) + (R − 2) | R − 2 |

To verify these projections, a simulation was performed with legacy architectures and architectures based on the new approach herein for R=1 through 5, and subfilter length M=2 through 10. The relative multiplication complexity is shown in FIG. 12, while the relative addition complexity is shown in FIG. 13.

In the HBF case (R=2), the legacy and new approaches have the same number of multiplications and the new approach has more additions. In the case of a third-band filter (TBF) (R=3), the new approach saves $2\lfloor M/2 \rfloor$ multiplications at the cost of two extra additions. The multiplications of the new approach are almost half those of the legacy approach.

Speaking more generally, some of the distinct features of embodiments of the present disclosure include, but are not limited to:

Re-structuring pairs of antisymmetric subfilters into symmetric subfilters;

A lattice structure of adders after the subfilters in the interpolators, and a lattice structure of adders before the subfilters in the decimators; and The number of multiplications are reduced by $\lfloor M/2 \rfloor (R-\gamma)$ at the cost of R–γ additions (where γ=1 when R is odd, and γ=2 when R is even).

A new efficient polyphase architecture for sampling rate conversion according to embodiments of the present disclosure is described herein, which involves generating a new set of subfilter coefficients based on any symmetry/antisymmetry found in the conventional set of subfilter coefficients so that any pair of conventional subfilter coefficients that exhibit symmetry/antisymmetry are combined into a simplified new architecture which produces the same overall output as using the conventional set of subfilter coefficients. In one embodiment, any pair of conventional subfilter coefficients that exhibit antisymmetry are combined into an architecture including a pair of adders, a lattice structure feeding the pair of adders, and a pair of subfilters whose location depends on the implementation (e.g., before the lattice structure in an interpolator, after the pair of adders in a decimator), where the pair of subfilters have new coefficients based on the antisymmetry of the conventional pair of subfilter coefficients.

The new architecture is applicable to any integer or fractional R interpolator, decimator, or fractional-rate conversion filter. Moreover, the new architecture can be generalized from Nyquist filters as described herein to linear-phase FIR or any type of FIR filters.

The combining of inputs or outputs to the subfilters according to embodiments of the present disclosure can be implemented in a wide variety of ways, as would be understood by one of ordinary skill in the art. Thus, although the lattice structure in the polyphase interpolator receives the output of the subfilters and the lattice structure in the polyphase decimator generates the input of the subfilters in an embodiment described herein, the present disclosure is not limited to such placement.

Figure 14:
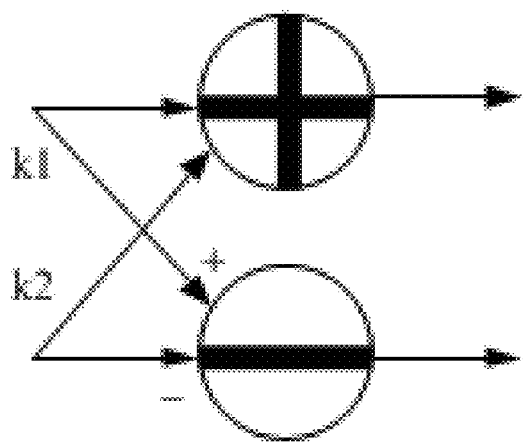
FIGS. 14 and 15 show examples of lattice implementations/structures according to other embodiments of the present disclosure.
Figure 15:
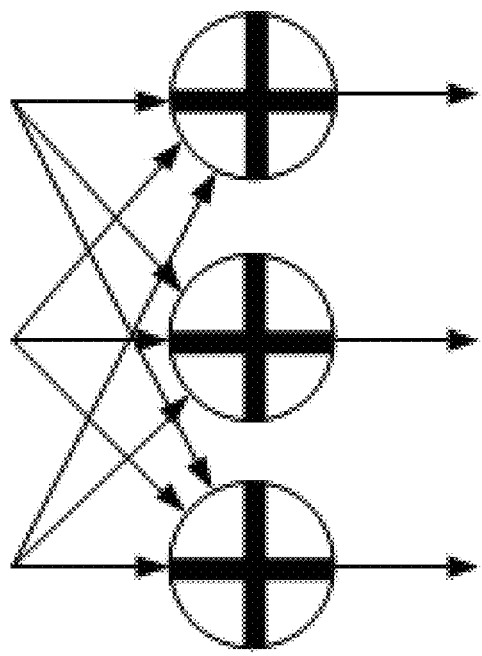

Moreover, the present disclosure is not limited to the lattice structures described in reference to the embodiments herein, but include other lattice structures and implementations. For example, a simple multiplication in the form of a bit shift may be implemented on the cross paths of the lattice structure, as shown in FIG. 14, where the multiplication coefficients $k_1$ and $k_2$ are in the form of power of 2. As another example, the lattice structure may be connected to more than a pair of adders and become a fully connected linear network, with 3 or more inputs and outputs, as shown in FIG. 15.

As yet another example, a lattice structure having groups of 4 subfilters could be generated by exploiting the Hadamard matrix operation from 2 dimensions to 4 dimensions. We first explain the perspective of Hadamard matrix operation for aforementioned example in two dimensions, let s' denote the left-to-right flip of sequence s. The initial set of subfilter coefficients with antisymmetric property can be shown as each row in the matrix described in Equation (14)(a) below:

$$\begin{bmatrix} s_1 & s_2 \\ s'_2 & s'_1 \end{bmatrix} \quad (14)(a)$$

and the lattice transform can be written as left-multiplying the above matrix with dimension-2 Hadamard matrix $H_2$ as $$\underbrace{\begin{bmatrix} 1 & 1 \\ 1 & -1 \end{bmatrix}}_{H_2} \begin{bmatrix} s_1 & s_2 \\ s'_2 & s'_1 \end{bmatrix} = \begin{bmatrix} s_1 + s'_2 & s_2 + s'_1 \\ s_1 - s'_2 & s_2 - s'_1 \end{bmatrix} = \begin{bmatrix} s_1 + s'_2 & (s_1 + s'_2)' \\ s_1 - s'_2 & -(s_1 - s'_2)' \end{bmatrix} \quad (14)(b)$$

where the right-hand side indicates the pair of two symmetric subfilters according to the present disclosure, which cuts down the number of multipliers by ½ for each subfilter.

To generalize to 4 subfilters, the original 4 subfilter coefficients would fit the description as indicated by Equation (15)(a). And the right-hand side of Equation (15)(b) indicates a group of four symmetric subfilters according to the present disclosure, which cuts down the number of multipliers by ¼ for each subfilter:

$$\begin{bmatrix} s_1 & s_3 & s_4 & s_2 \\ s'_2 & s'_4 & s'_3 & s'_1 \\ s_3 & s_1 & s_2 & s_4 \\ s'_4 & s'_2 & s'_1 & s'_3 \end{bmatrix} \quad (15)(a)$$

$$\underbrace{\begin{bmatrix} 1 & 1 & 1 & 1 \\ 1 & -1 & 1 & -1 \\ 1 & 1 & -1 & -1 \\ 1 & -1 & -1 & 1 \end{bmatrix}}_{H_4} \quad (15)(b)$$

$$\begin{bmatrix} s_1 & s_3 & s_4 & s_2 \\ s'_2 & s'_4 & s'_3 & s'_1 \\ s_3 & s_1 & s_2 & s_4 \\ s'_4 & s'_2 & s'_1 & s'_3 \end{bmatrix} = \begin{bmatrix} s_1+s'_2+s_3+s'_4 & s_3+s'_4+s_1+s'_2 & s_4+s'_3+s_2+s'_1 & s_2+s'_1+s_4+s'_3 \\ s_1-s'_2+s_3-s'_4 & s_3-s'_4+s_1-s'_2 & s_4-s'_3+s_2-s'_1 & s_2-s'_1+s_4-s'_3 \\ s_1+s'_2-s_3-s'_4 & s_3+s'_4-s_1-s'_2 & s_4+s'_3-s_2-s'_1 & s_2+s'_1-s_4-s'_3 \\ s_1-s'_2-s_3+s'_4 & s_3-s'_4-s_1+s'_2 & s_4-s'_3-s_2+s'_1 & s_2-s'_1-s_4+s'_3 \end{bmatrix} =$$

$$\begin{bmatrix} s_1+s'_2+s_3+s'_4 & s_1+s'_2+s_3+s'_4 & (s_1+s'_2+s_3+s'_4)' & (s_1+s'_2+s_3+s'_4)' \\ s_1-s'_2+s_3-s'_4 & s_1-s'_2+s_3-s'_4 & -(s_1-s'_2+s_3-s'_4)' & -(s_1-s'_2+s_3-s'_4)' \\ s_1+s'_2-s_3-s'_4 & -(s_1+s'_2-s_3-s'_4) & -(s_1+s'_2-s_3-s'_4)' & (s_1+s'_2-s_3-s'_4)' \\ s_1-s'_2-s_3+s'_4 & -(s_1-s'_2-s_3+s'_4) & (s_1-s'_2-s_3+s'_4)' & -(s_1-s'_2-s_3+s'_4)' \end{bmatrix}$$

The steps and/or operations described above in relation to an embodiment of the present disclosure may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these are known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Some embodiments of the present disclosure may be implemented, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

While several embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A method for a polyphase interpolator, comprising:
receiving, by a bank of R subfilters, each of N samples in parallel as input to the polyphase interpolator, wherein the bank of R subfilters comprises one or more pairs of subfilters, where each pair of subfilters has symmetric coefficients;
adding outputs of a first subfilter and a second subfilter in one of the one or more pairs of subfilters and providing the added outputs as parallel input to a parallel-to-serial (P2S) converter; and
subtracting the output of the second subfilter from the output of the first subfilter in the one of the one or more pairs of subfilters and providing the result of the subtraction as parallel input to the P2S converter,
wherein the symmetric coefficients of each of the one or more pairs of subfilters are transformed from an initial pair of antisymmetric coefficients $h_m$ and $h_{R-m}$, R being a total number of subfilters, and m being a subfilter index, where m=1, 2, ..., R.

2. The method of claim 1, further comprising:
generating, by the P2S converter, a serial stream of R×N samples as output of the polyphase interpolator.

3. The method of claim 1, wherein the bank of R subfilters further comprises a subfilter whose coefficients are symmetric, wherein tap outputs in the subfilter having the same coefficient are added together before being multiplied by the same coefficient, the method further comprising:
providing the output of the symmetric coefficient subfilter as parallel input to the P2S converter.

4. The method of claim 1, wherein:
the first subfilter of the one of the one or more pairs of subfilters has a first coefficient function:

$$\left(\frac{h_m + h_{R-m}}{2}\right);$$

and
the second subfilter of the one of the one or more pairs of subfilters has a second coefficient function:

$$\left(\frac{h_m + h_{R-m}}{2}\right)$$

wherein, when the input to each subfilter is x, the outputs of the pair of subfilters are $$x*\left(\frac{h_m + h_{R-m}}{2}\right); \text{ and } x*\left(\frac{h_m - h_{R-m}}{2}\right),$$

respectively.

5. The method of claim 4, wherein adding outputs of the first subfilter and the second subfilter and providing the added outputs as parallel input to the P2S convertor comprises:
adding $$x*\left(\frac{h_m + h_{R-m}}{2}\right) \text{ and } x*\left(\frac{h_m - h_{R-m}}{2}\right);$$

and
providing $$x*h_m = x*\left(\frac{h_m + h_{R-m}}{2}\right) + x*\left(\frac{h_m - h_{R-m}}{2}\right)$$

as parallel input to the P2S converter.

6. The method of claim 4, wherein subtracting the output of the second subfilter from the output of the first subfilter in the pair and providing the result of the subtraction as parallel input to the P2S converter comprises:
adding $$x*\left(\frac{h_m + h_{R-m}}{2}\right)$$

and the negative value of $$x*\left(\frac{h_m - h_{R-m}}{2}\right);$$

and
providing $$x*h_{(R-m)} = x*\left(\frac{h_m + h_{R-m}}{2}\right) - x*\left(\frac{h_m - h_{R-m}}{2}\right)$$

as parallel input to the P2S converter.

7. The method of claim 1, wherein the polyphase interpolator comprises a polyphase finite impulse response (FIR) digital filter.

8. The method of claim 1, wherein the polyphase interpolator comprises a polyphase Nyquist digital filter.

9. The method of claim 1, wherein the polyphase interpolator is capable of sampling rate conversion,
wherein the symmetric coefficients of each of the one or more pairs of subfilters are generated from coefficients in an initial set of coefficients, where the coefficients in the initial set of coefficients exhibit antisymmetric pair properties, and
wherein the polyphase interpolator generates the same overall output as a polyphase interpolator comprising subfilters having the coefficients from the initial set of coefficients.

10. The method of claim 9, wherein the bank of R subfilters further comprises a subfilter whose coefficients are symmetric, wherein tap outputs in the subfilter having the same coefficient are added together before being multiplied by the same coefficient, the method further comprising:
providing the output of the symmetric coefficient subfilter as parallel input to the P2S converter.

* * * * *